US012745704B2

(12) United States Patent
Rittershofer et al.

(10) Patent No.: US 12,745,704 B2
(45) Date of Patent: Sep. 29, 2026

(54) SENSORY ASSEMBLY FOR DETECTING THE HEIGHT OF A MIXTURE ON A CONVEYOR FLOOR AND/OR SIEVE OF A CLEANING SYSTEM OF A COMBINE HARVESTER

(71) Applicant: Deere & Company, Moline, IL (US)

(72) Inventors: Martin Rittershofer, Mannheim (DE); Marco Broschart, Mannheim (DE); Maximilian Höpfner, Mannheim (DE); Andi Guenther, Mannheim (DE); Ralf Huebner, Mannheim (DE)

(73) Assignee: Deere & Company, Moline, IL (US)

( * ) Notice: Subject to any disclaimer, the term of this patent is extended or adjusted under 35 U.S.C. 154(b) by 312 days.

(21) Appl. No.: 18/601,265

(22) Filed: Mar. 11, 2024

(65) Prior Publication Data

US 2024/0357965 A1 Oct. 31, 2024

(30) Foreign Application Priority Data

Apr. 25, 2023 (DE) ........................ 102023110538.8

(51) Int. Cl.
*A01D 41/127* (2006.01)

(52) U.S. Cl.
CPC ..... *A01D 41/1271* (2013.01); *A01D 41/1276* (2013.01)

(58) Field of Classification Search
CPC ............ A01D 41/1271; A01D 41/1276; A01D 75/282; A01F 12/446
See application file for complete search history.

(56) References Cited

U.S. PATENT DOCUMENTS 3,345,626 A * 10/1967 Thomas ............. A01D 41/1276 340/684
4,360,998 A * 11/1982 Somes ............... A01D 41/1271 56/DIG. 15

(Continued)

FOREIGN PATENT DOCUMENTS

| | | | |
|---|---|---|---|
| DE | 102022118393 | A1 | 1/2024 |
| EP | 1449425 | A1 | 8/2004 |
| EP | 2537404 | A1 | 12/2012 |

(Continued)

OTHER PUBLICATIONS

Extended European Search Report and Written Opinion issued in European Patent Application No. 24166354.1 dated Sep. 17, 2024, in 15 pages.

*Primary Examiner* — Russell Frejd
(74) *Attorney, Agent, or Firm* — Taft Stettinius & Hollister LLP; Stephen F. Rost

(57) ABSTRACT

A sensor assembly for detecting the height of a mixture on a conveyor floor and/or a sieve of a cleaning system of a combine harvester is assembled with the combine harvester. The sensor assembly includes at least two light-sensitive sensors, positioned one above the other, and an emitter at a distance from the sensors, are attached on the upper side of the conveyor floor and/or the sieve. The sensors are configured to receive light radiated from the emitter as long as the light is not absorbed by the mixture, and the sensors are connected to an analysis device which is configured to generate an output signal representative of the height of the mixture on the basis of the output signal of the sensors.

20 Claims, 5 Drawing Sheets

(56) References Cited

U.S. PATENT DOCUMENTS

| | | | | |
|---|---|---|---|---|
| 2022/0232770 | A1* | 7/2022 | Yanke .................. | A01D 41/127 |
| 2024/0122107 | A1* | 4/2024 | Missotten ............ | A01D 41/141 |

FOREIGN PATENT DOCUMENTS

| | | | |
|---|---|---|---|
| EP | 3210458 | A1 | 8/2017 |
| EP | 3482624 | A1 | 5/2019 |
| EP | 3794928 | A1 | 3/2021 |
| WO | 2015181143 | A1 | 12/2015 |
| WO | WO 2017040261 | A1 | 3/2017 |
| WO | 2019171246 | A1 | 9/2019 |
| WO | WO 2020126211 | A1 | 6/2020 |
| WO | WO 2022023834 | A1 | 2/2022 |
| WO | WO 2022090826 | A1 | 5/2022 |

* cited by examiner

SENSORY ASSEMBLY FOR DETECTING THE HEIGHT OF A MIXTURE ON A CONVEYOR FLOOR AND/OR SIEVE OF A CLEANING SYSTEM OF A COMBINE HARVESTER

RELATED APPLICATION

This application claims priority to application DE 10 2023 110 538.8, filed Apr. 25, 2023, which is hereby incorporated by reference herein in its entirety.

FIELD OF THE DISCLOSURE

The present disclosure relates generally to a combine harvester and more particularly to a sensor assembly for detecting a height of a mixture on a conveyor floor and/or sieve of a cleaning system of the combine harvester.

BACKGROUND

Combine harvesters serve to harvest grain. The aboveground parts or fruits of plants, such as soy, wheat, or oats, are cut off or picked up or stripped off, or the seed heads of the plants such as corn or sunflowers, are separated off and fed to a threshing and separating device in order to separate the grain from the remaining constituent parts of the harvested crop. After the threshing and separating operation, there are still contaminants in the grain, such as particles of straw and chaff. The mixture of grain and contaminants obtained during the threshing and separation is therefore fed to a cleaning system, which usually comprises a top sieve and a bottom sieve and optionally a pre-sieve and/or a conveyor floor.

SUMMARY

As described herein, a sensor assembly for a combine harvester is provided in which the disadvantages mentioned above do not occur or occur to a reduced extent.

The disclosure provides a sensor assembly configured to detect a height of a mixture on a conveyor floor and/or a sieve of a cleaning system of a combine harvester, the sensor assembly comprising: at least two light-sensitive sensors, positioned one above the other; an emitter positioned at a distance from the sensors, wherein the emitter is attached to an upper side of the conveyor floor and/or the sieve, wherein the sensors are configured to receive light radiated from the emitter while a path of the light from the emitter to the sensors is not interrupted by the mixture; and an analysis device operably coupled to the sensors, the analysis device configured to generate an output signal representative of the height of the mixture on the basis of an output signal received from the sensors.

In some implementations, the emitter is configured to emit light in any of the visible range, the infrared range, and/or the ultraviolet wavelength range, and the sensors are sensitive within the corresponding wavelength range.

In some implementations, the sensors and the emitter are spaced apart from one another in a lateral direction.

In some implementations, the sensors and the emitter are assembled to form a photoelectric barrier, and further wherein a plurality of the photoelectric barriers are arranged offset relative to one another in a lateral direction and/or a conveying direction of the mixture.

In one refinement, each of the plurality of the photoelectric barriers includes the sensors and the emitter arranged inside a housing.

In a further refinement, each of the housings is arranged in a recess of a separating plate.

In another implementation, there is provided a cleaning system with a conveyor floor and/or a sieve of a combine harvester, the cleaning system comprising: a sensor assembly configured to detect a height of a mixture on the conveyor floor and/or the sieve, the sensor assembly including: at least two light-sensitive sensors, positioned one above the other; an emitter positioned at a distance from the sensors, wherein the emitter is attached to an upper side of the conveyor floor and/or the sieve, wherein the sensors are configured to receive light radiated from the emitter while a path of the light from the emitter to the sensors is not interrupted by the mixture; and an analysis device operably coupled to the sensors, the analysis device configured to generate an output signal representative of the height of the mixture on the basis of an output signal received from the sensors.

In some implementations, the analysis device is connected to a control unit that is configured to activate, based on the generated output signal, an actuator assembled with the combine harvester to control a lateral distribution of the mixture in a uniform distribution.

In some implementations, the actuator is configured to activate one or more flaps that are distributed on an underside of a threshing region of an axial threshing unit assembled with the combine harvester.

In some implementations, the one or more flaps are activated in a peripheral direction in such a way that the one or more flaps are closed at that side on which the height of the mixture is greater than on the other side, and the one or more flaps are opened on the side with a smaller height of the mixture to thereby adjust one or more guide plates to control the lateral distribution of the mixture.

In some implementations, the adjustment of the one or more guide plates is by performed by a drive of a cross conveyor arranged between the conveyor floor and the sieve.

In another implementation, there is provided a combine harvester comprising: a cleaning system with a conveyor floor and/or a sieve; a sensor assembly configured to detect a height of a mixture on the conveyor floor and/or the sieve, the sensor assembly including: at least two light-sensitive sensors, positioned one above the other; an emitter positioned at a distance from the sensors, wherein the emitter is attached to an upper side of the conveyor floor and/or the sieve, wherein the sensors are configured to receive light radiated from the emitter while a path of the light from the emitter to the sensors is not interrupted by the mixture; and an analysis device operably coupled to the sensors, the analysis device configured to generate an output signal representative of the height of the mixture on the basis of an output signal received from the sensors.

In some implementations, the emitter is configured to emit light in any of the visible range, the infrared range, and/or the ultraviolet wavelength range, and the sensors are sensitive within the corresponding wavelength range.

In some implementations, the sensors and the emitter are spaced apart from one another in a lateral direction.

In some implementations, the sensors and the emitter are assembled to form a photoelectric barrier, and further wherein a plurality of the photoelectric barriers are arranged offset relative to one another in a lateral direction and/or a conveying direction of the mixture.

In some implementations, each of the plurality of the photoelectric barriers includes the sensors and the emitter arranged inside a housing assembled with the conveyor floor.

In some implementations, the analysis device is connected to a control unit that is configured to activate, based on the generated output signal, an actuator assembled with the combine harvester to control a lateral distribution of the mixture in a uniform distribution.

In some implementations, the actuator is configured to activate one or more flaps that are distributed on an underside of a threshing region of an axial threshing unit assembled with the combine harvester.

In some implementations, the one or more flaps are activated in a peripheral direction in such a way that the one or more flaps are closed at that side on which the height of the mixture is greater than on the other side, and the one or more flaps are opened on the side with a smaller height of the mixture to thereby adjust one or more guide plates to control the lateral distribution of the mixture.

In some implementations, the adjustment of the one or more guide plates is by performed by a drive of a cross conveyor arranged between the conveyor floor and the sieve.

BRIEF DESCRIPTION OF THE DRAWINGS

The above-mentioned aspects of the present disclosure and the manner of obtaining them will become more apparent and the disclosure itself will be better understood by reference to the following description of the implementations of the disclosure, taken in conjunction with the accompanying drawings, wherein.

DETAILED DESCRIPTION

Figure 1:
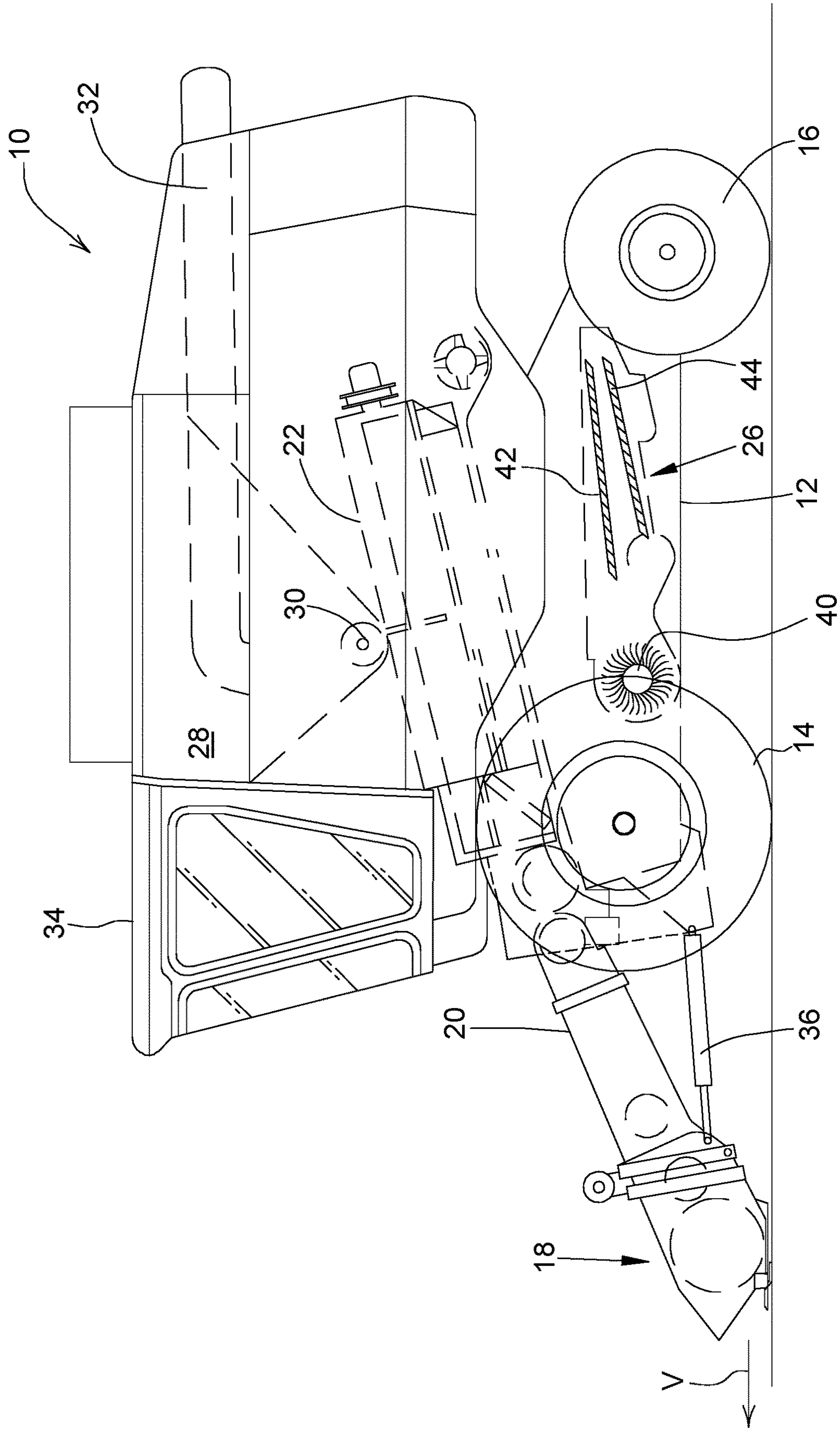
FIG. 1 illustrates a schematic side view of a combine harvester.

FIG. 1 shows a self-propelled harvesting machine in the form of a combine harvester 10, having a chassis 12 which is supported on the ground via driven front wheels 14 and steerable rear wheels 16 and which is moved by said wheels. The wheels 14, 16 are set in rotation by drive means (not shown) in order to move the combine harvester 10, for example, over a field that is to be harvested. In the following text, direction indications, such as front and rear, relate to the direction of travel V, running to the left in FIG. 1, of the combine harvester 10 in harvesting operation.

A harvesting header 18 in the form of a cutting unit is removably attached to the front end region of the combine harvester 10 in order, in harvesting operation, to harvest a crop in the form of cereal or other threshable cereal crops from the field and to feed the crop upwardly and rearwardly through a feeder house system 20 to an axial threshing unit 22. The mixture passing through threshing concaves and gratings in the axial threshing unit 22 and containing grains and contaminants passes into a cleaning system 26. Cereal cleaned by the cleaning system 26 is fed by means of a grain screw to a grain elevator which delivers it into a grain tank 28. The cleaned cereal from the grain tank 28 can be discharged by a discharge system with a transverse screw 30 and a discharge conveyor 32. The abovementioned systems are driven by means of an internal combustion engine and are monitored and controlled by an operator from a driver's cab 34. The axial threshing unit 22 is only one exemplary embodiment and could be replaced by a tangential threshing unit having successive separating devices in the form of separator drums and/or straw walkers or axial separating rotors.

The cleaning system 26 comprises a top sieve 42 and a bottom sieve 44 which are subjected, by a fan 40, to the action of an air flow flowing rearwardly and upwardly through the sieves 42, 44. The size of the sieve openings and the rotational speed of the fan 40 may be varied by an automatic cleaning setting or by the operator from the driver's cab 34.

The mixture of grain and contaminants released (threshed) from the crop in the front region of the axial threshing unit 22 is conveyed rearwardly by a front conveyor 46 with augers 63 arranged next to one another, which thus serves to convey the threshed mixture. A rear conveyor 48 conveys the mixture separated in the rear region of the axial threshing unit 22 forward.

Provided at the dispensing end of the front conveyor 46 is a conveyor floor 56, which is followed toward the rear by a cross conveyor 50. Provided to the rear of the cross conveyor 50 are a number of slats 52 which are arranged one behind the other and extend per se transversely and obliquely upwardly and rearwardly. Located beneath the cross conveyor 50 is a further conveyor floor 54.

Figure 2:
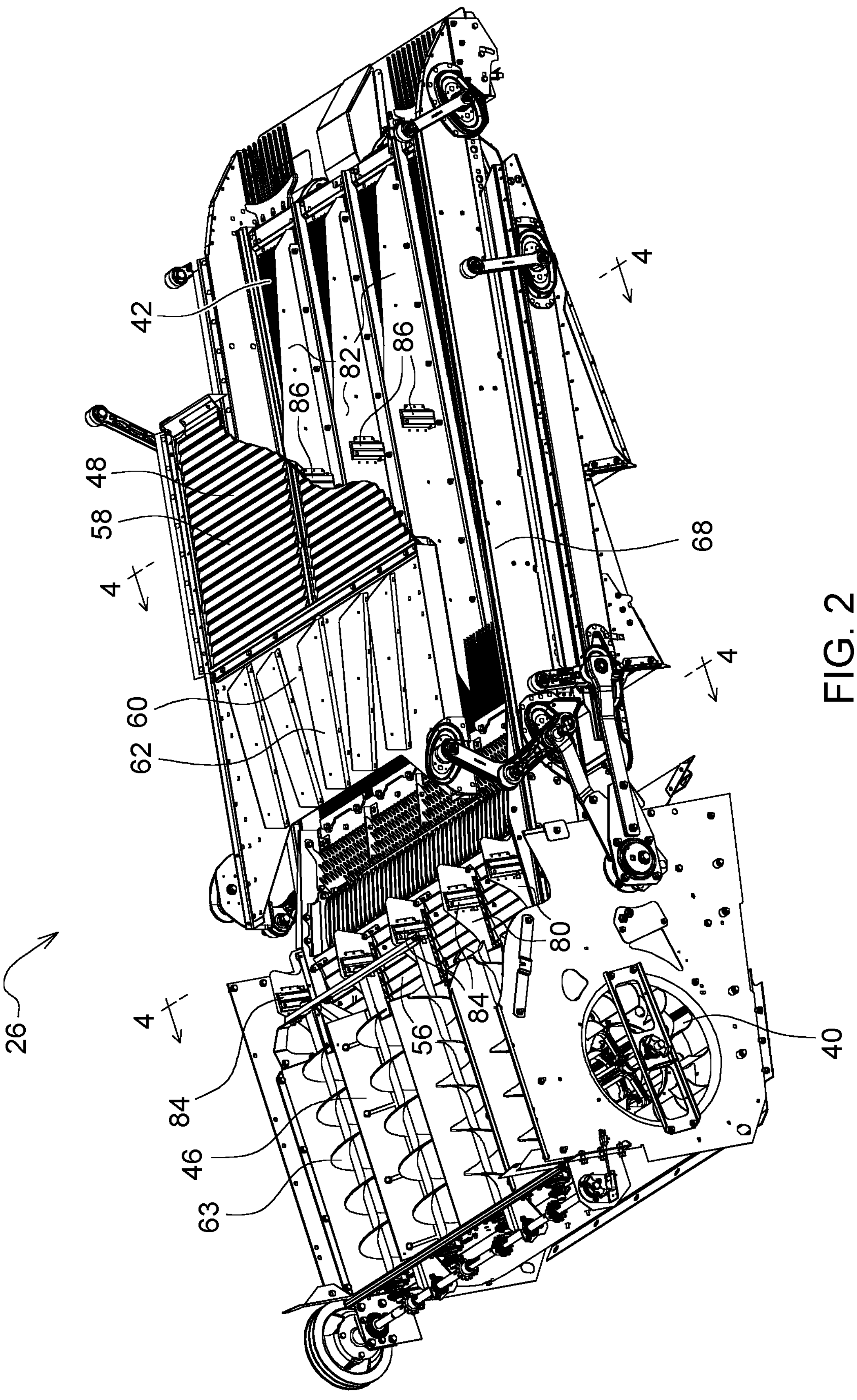
FIG. 2 illustrates a perspective view of the cleaning system of the combine harvester in FIG. 1 from the rear, on the left, and above.
Figure 3:
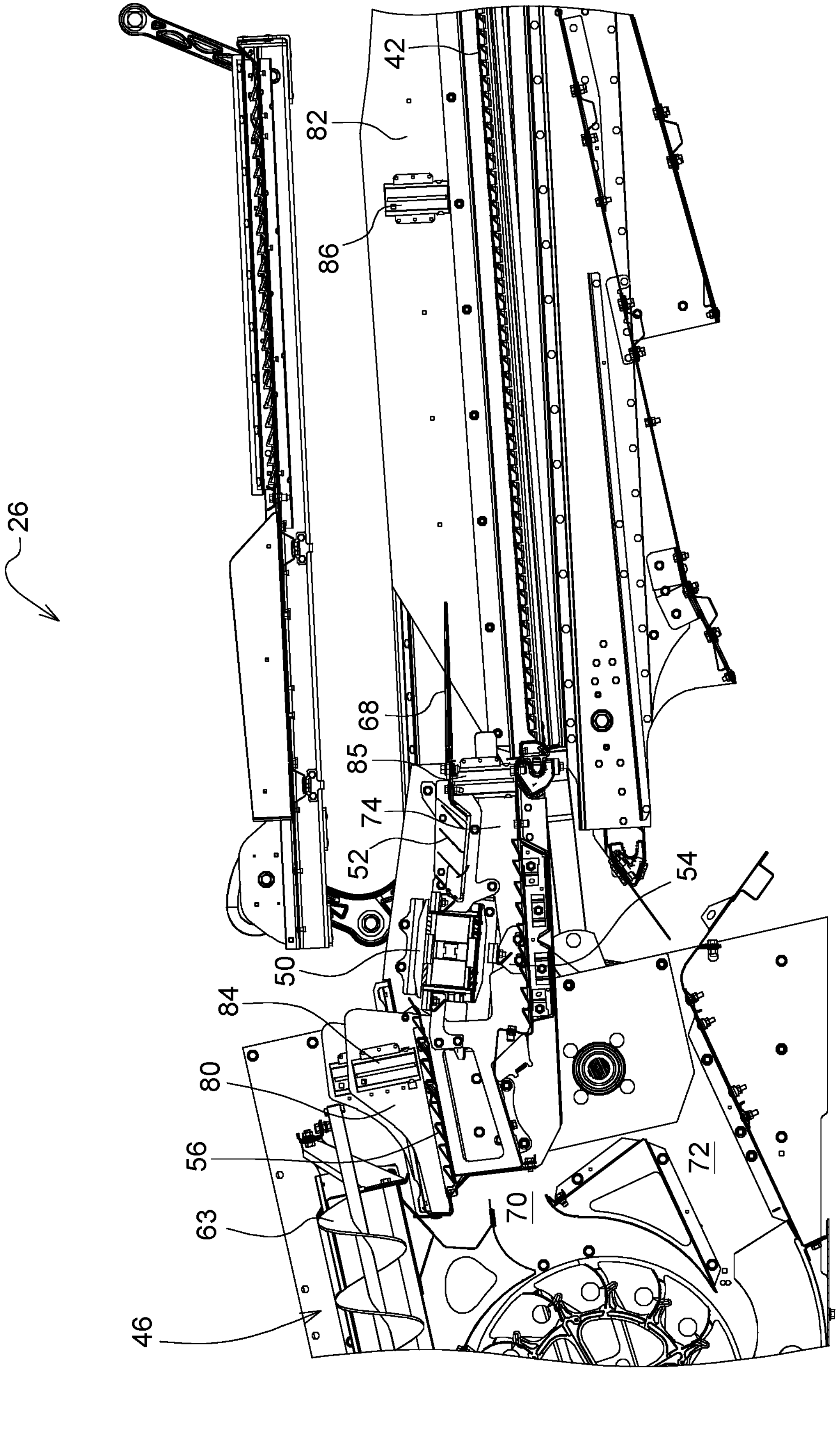
FIG. 3 illustrates a view of the cleaning system similar to FIG. 2 but with no rear conveyor floor.

Reference is now made to FIGS. 2 to 3. The front conveyor 46 comprises a number of augers 63 which extend in the forward direction V (see FIG. 1) and are arranged laterally next to one another. The conveyor floor 56 which follows immediately downstream is arranged beneath the rear end of the front conveyor 46 and offset forwardly with its front end with respect to the rear end of the front conveyor 46. The conveyor floor 56 is equipped with transversely extending sawtooth profiles. Arranged on the upper side of the conveyor floor 56 are separating plates 80 which extend vertically and in the forward direction V and are each arranged in a lateral direction on a hypothetical line which is situated centrally between two augers 63 of the front conveyor 46. The separating plates 80 are intended to prevent the mixture from moving laterally on the conveyor floor 56, in particular when traveling on a slope.

The rear conveyor 48 comprises a rear region with transversely extending sawtooth profiles 58 and a smooth front region 60 with vertically extending guide plates 62 which laterally bring together the separated mixture. This passes, as illustrated in FIGS. 1 to 3, onto the cross conveyor 50. As shown in FIG. 2, the front region 60 is provided centrally at its front end with a cutout. The separated mixture is accordingly dispensed onto the cross conveyor 50 mostly in the middle thereof. During operation, the rear conveyor 48 is set in a back-and-forth and up-and-down oscillating motion, this also being the case analogously for the sieves 42, 44. For this purpose, the rear conveyor 48 can be mounted on rockers and be set in said motion via an eccentric drive. Depending on the position of the rear conveyor 48 and on the lateral position of the dispensing of material, the crop dispensed by the rear conveyor passes onto the cross conveyor 50 and/or onto the slats 52.

The conveyor floor 56, the cross conveyor 50, and to a certain extent also the slats 52 accordingly form an inlet of the cleaning system 26. Provided below the cross conveyor

50 is the further conveyor floor 54, which is equipped with transversely extending sawtooth profiles. The cross conveyor 50 forms, with the conveyor floor 56, the slats 52, and rearwardly extending finger rakes 68 attached behind the slats 52, a system which can be set jointly in oscillating motion, i.e. moves continuously back and forth and up and down, analogously to the rear conveyor 48.

An upper outlet 70 of the fan 40 opens out below the conveyor floor 56. A lower outlet 72 of the fan 40 is directed at the sieves 42, 44. Separating plates 82 extending in the longitudinal direction are arranged next to one another on the upper side of the top sieve 42.

Further details of the structure of the cleaning system 26 and in particular of the cross conveyor 50 and its activation in terms of making the distribution of the crop uniform over the width of the cleaning system 26 can be found in DE 10 2022 118 393 A1, the disclosure of which is incorporated herein by reference.

In order to detect the height of the mixture and its lateral distribution on the conveyor floor 56 which dispenses the mixture of grain and contaminants released (threshed) from the harvested crop in the front region of the axial threshing unit 22 rearwardly onto the top sieve 42 via the cross conveyor 50, the slats 52, and the conveyor floor 54, as well as the finger rakes 68, a number of sensor systems 84 are attached to the separating plates 80 arranged above the conveyor floor 56.

Furthermore, the conveyor floor 54 is also provided below the finger rakes 68 with sensor systems 85 distributed over its width which are attached to separating plates 74 which are installed above the conveyor floor, extend there in the forward direction V and are distributed over its width in a similar fashion to the separating plates 80. Similarly, a number of sensor systems 86 are attached to the separating plates 82 above the top sieve 42 in order to detect the height and lateral distribution of the mixture there.

Figure 4:
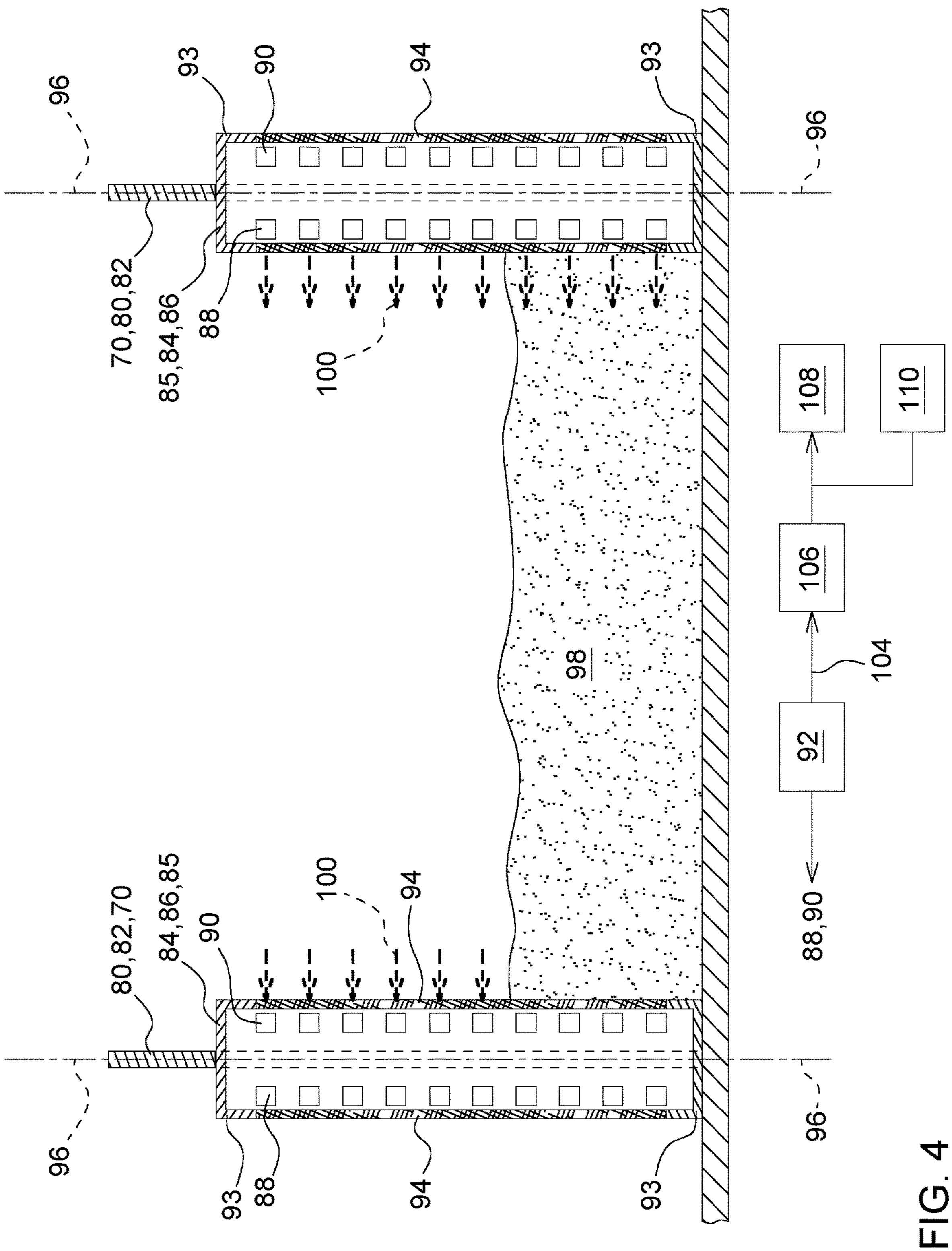
FIG. 4 shows a section along the line 4-4 in FIG. 2 with a first embodiment of a sensor assembly.

The structure of the sensor systems 84, 85, 86 is illustrated in FIG. 4. They comprise, on a side (drawn on the left-hand side in FIG. 4) of their longitudinal central plane 96 extending vertically and in a forward direction, that of the longitudinal central plane of the separating plate 80 and 74 or 82, a number of light emitters 88 arranged one above the other and, on the respective other side of their longitudinal central plane 96, a number of light-sensitive sensors 90 arranged one above the other. Light here means not only the wavelength range visible to humans but also the infrared and ultraviolet wavelength range. The emitters 88 can be light-emitting diodes, for example for red light, or laser diodes or other suitable electronic components that emit light, and the receivers 90 can be phototransistors or photodiodes or any other light-sensitive electronic components. The sensors 90 and emitters 88 are arranged inside housings 93 which are equipped with light-permeable windows 94 in the region of the sensors 90 and emitters 88. The housings 93 are for their part fastened in corresponding recesses in the separating plates 80, 82.

In each case an emitter 88 of a sensor system 84, 85, 86 (for example, drawn on the right-hand side in FIG. 4) and a sensor 90 of an adjacent sensor system 84, 85, 86 (for example, drawn on the left-hand side in FIG. 4) form a photoelectric barrier, as indicated by the arrows 100 in FIG. 4. For this purpose, the light of the emitters 88 can be focused as precisely as possible, for example by a lens, on the sensors 90 associated in pairs and arranged at the same height. It could also be conceivable to use fewer emitters 88 as sensors 90 if the emitters 88 output a light beam which is spread out sufficiently widely in the vertical direction. In particular, a single emitter 88 can be arranged at or above the height of the uppermost sensor 90.

If the mixture 98 is situated at a certain height above the conveyor floor 56 or the top sieve 42, depending on its height the optical connection between one or more sensors 90 and emitters 88 is interrupted and the associated sensor 90 receives no, or at least less light than if the mixture 98 does not interrupt this optical connection, i.e. the upper edge of the mixture 98 lies below the sensor 90 and the emitter 88. The height of the mixture 98 accordingly lies between the position of the highest sensor 90 that receives no or reduced light intensity and the position of the lowest sensor 90 which still receives light. In FIG. 4, the fifth sensor 90 from the bottom (and the sensors 90 situated above it) would thus still receive light and the bottom four sensors 90 would receive no light because the height of the mixture 98 lies exactly between the fifth and fourth sensor 90 from the bottom.

The emitters 88 and sensors 90 are electrically connected to an analysis device 92 which supplies an output signal 104, either via a cable or wirelessly (radio waves or similar). The analysis device 92 evaluates the signals of the sensors 90 and supplies the output signal 104 indicating how high the mixture 98 is. Because a number of sensor systems 84, 85, 86 forming photoelectric barriers are distributed over the width of the conveyor floor 56 and the top sieve 42, the output signal 104 receives information on the height of the mixture 98 at different points of the width of the conveyor floor 56 and the top sieve 42.

The sensor systems 84, 85, 86 are also attached to the side walls of the top sieve 42 and the conveyor floor 56 as well as the conveyor floor 54. In each case either only the emitters 88 or only the sensors 90 of these sensor systems 84, 85, 86 are required. Either these sensor systems are divided along their longitudinal central plane 96 into two parts, in each case one of which is attached to a side wall of the sieve 42 or conveyor floor 56 and 54, or complete sensor systems are used at which those emitters and receivers which are not required are not used.

In a different embodiment to that shown in FIG. 4, two different types of sensor systems 84, 85, 86 could be used in which one is equipped only with emitters 88 which radiate in both lateral directions and the other is equipped only with sensors 90 which are sensitive in both lateral directions.

Figure 5:
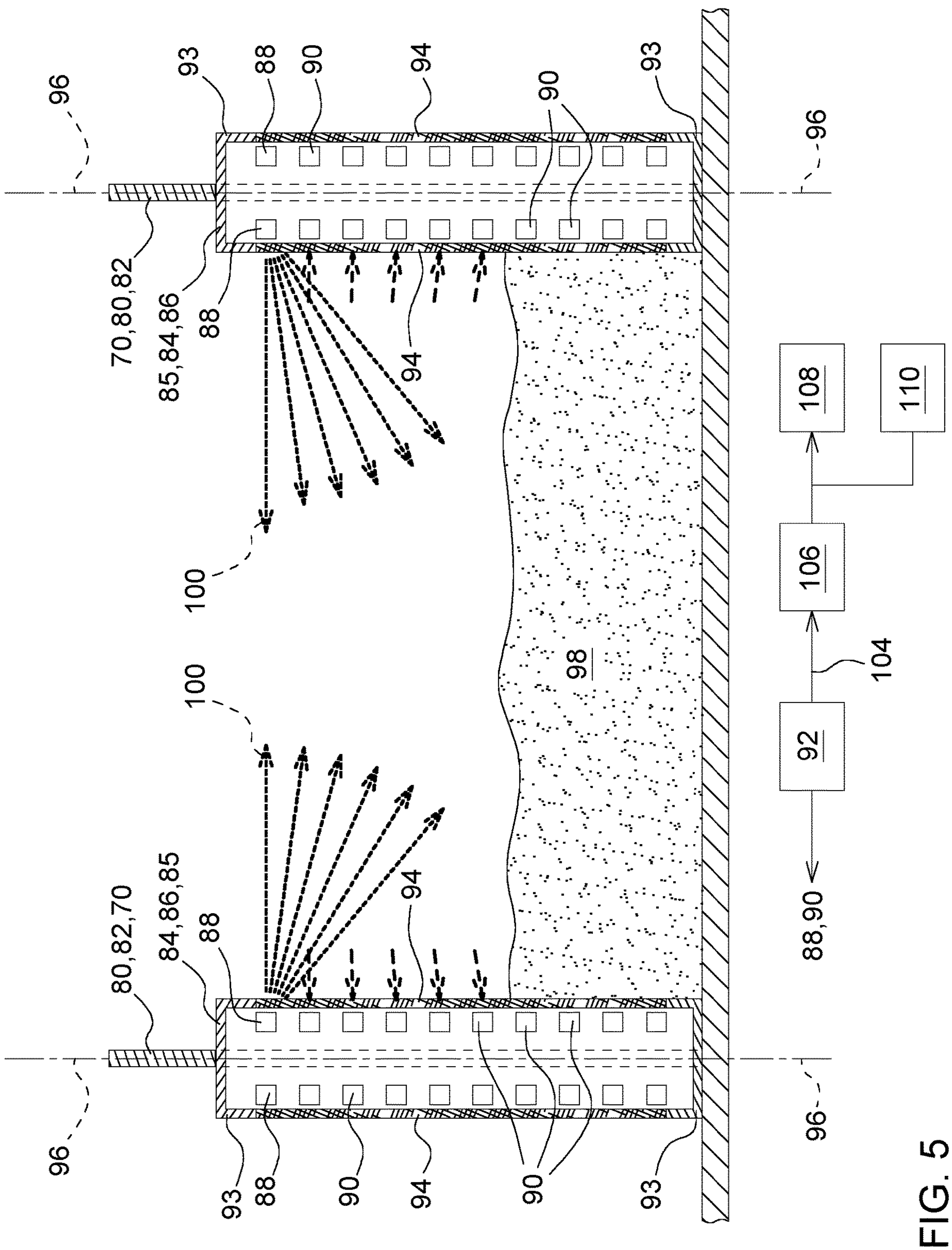
FIG. 5 shows a drawing similar to FIG. 4 with a second embodiment of a sensor assembly.

In the case of another different embodiment as shown in FIG. 5, the sensor systems 84, 85, 86 could be equipped on both sides of their longitudinal central plane 96 with sensors 90 arranged one above the other, i.e. the emitters 88 shown in FIG. 4 are replaced by sensors 90. In each case one emitter 88 is attached to the upper side of the sensor system 84, 85, 86 at the same height as or above the uppermost sensor 90 and possibly offset laterally relative to the sensors 90 (or emitters 88 are arranged one above the other but offset transversely to the plane of the drawings in FIG. 4 relative to the adjacent sensors 90). As a result, two photoelectric barriers (one acting from left to right and one from right to left) are then obtained which can work in particular in multiplex mode, i.e. with activations of the emitters 88 and analysis at the sensors 90 taking place at staggered times.

The output signal 104 of the analysis device 92 is fed to a control unit 106 which evaluates it and can activate a display device 108 in the cab 34 in order to display to the operator the lateral distribution of the mixture 98 and its height (compare in this respect the disclosure of WO 2019/171246 A1 which is herein incorporated by reference). Should the distribution not be uniform, the operator can thus initiate corresponding measures (compare the following explanations of the automatic activation of actuators 110 which can be performed by hand or using input means and actuators 110). For the analysis of the signal (and in particular the associated points in time at which it is detected), reference should be made to WO 2015/181143 A1 which is herein incorporated by reference.

Alternatively or additionally, the control unit 106 can automatically activate one or more actuators 110 based on the output signal 104 of the analysis device 92. In one embodiment, detection on the basis of the output signal 104 that the lateral distribution of the mixture 98 on the conveyor floor 56 is not uniform, which can occur for example when the combine harvester 10 is harvesting crops on a slope. Flaps which are distributed on the underside of the threshing region of the axial threshing unit 22 in its peripheral direction can be activated by the actuator or actuators 110 in such a way that the flaps are partially or completely closed on that side at which the height of the mixture 98 is greater than on the other side and those on the side with a lower height of the mixture 98 are in contrast opened.

The totaled or average height of the mixture 98 on the conveyor floor 56 and/or 54 is additionally a measure of the throughput and can be used by the control unit 106 for automatically setting the speed of advance of the combine harvester 10 and/or for automatically setting operating parameters of the cleaning system 26 such as the rotational speed of the fan 40 and/or the degree of opening of the slats of the sieves 42 and/or 44.

In the same embodiment or a different one, the control unit 106 can control the driving of the cross conveyor 50 on the basis of the output signal 104 which contains information on the distribution of the mixture 98 over the width of the top sieve 42. If the output signal 104 thus indicates that more mixture 98 lies on one side of the top sieve 98 than on the other side, the control unit 106 will activate the drive, serving here as an actuator 110, of the cross conveyor 50 in such a way that its upper side moves in the direction of the side on which the lower amount of mixture 98 is present, and to be precise more quickly the greater the difference in height in the mixture 98. The control unit 106 can also take into account the height of the mixture 98 on the conveyor floor 56 and/or 54, the sensor systems 84 and 85 which interact with the mixture 98 sooner than the sensor systems 86 on the sieve 42. These signals can serve to proactively activate the drive of the cross conveyor 50. The control unit 106 is configured to learn, on the basis of the signals of the sensor systems 84 and 85 for the conveyor floors 56 and 54 and the sensor systems 86 for the sieve 42, activation of the drive of the cross conveyor 50 for distribution of the mixture 98 on the conveyor floor 56 results in distribution on the sieve 42 and, based thereon, to proactively activate the drive accordingly.

The totaled or average height of the mixture 98 on the sieve 42 can, as an alternative to or in addition to that on the conveyor floor 56, be used by the control unit 106 for automatically setting operating parameters of the cleaning system 26 such as the rotational speed of the fan 40 and/or the degree of opening of the slats of the sieves 42 and/or 44.

The sensor systems 84, 85, 86 can be attached to the guide plates 62 of the front region 60 of the rear conveyor 48 and can be used to automatically activate a drive for adjusting the guide plates 62 for making the distribution of the mixture 98 uniform over the width of the cleaning system 26. The rear conveyor 48 is then considered as a conveyor floor. A sensor system 86 can also be attached to longitudinally extending separating plates 82 on the bottom sieves 44.

A sensor assembly for detecting the height of a mixture on a conveyor floor and/or sieve of a cleaning system of a combine harvester includes at least two light-sensitive sensors positioned one above the other on the upper side of the conveyor floor and/or the sieve, and at least one emitter attached at a distance from the sensors. The sensors are configured to receive light radiated from the emitter as long as it is not absorbed or scattered by the mixture, i.e. the path of the light from the emitter to the sensor is not interrupted by the mixture. The sensors are connected to an analysis device which is configured to generate an output signal representative of the height of the mixture on the basis of the output signal of the sensors. As such, detection of the height of the mixture above the conveyor floor and/or the sieve is achieved with little effort.

The emitter can be configured to emit light in the visible and/or in the infrared and/or in the ultraviolet wavelength range, whilst the sensors can be sensitive within that wavelength range.

The sensors and the emitter are in particular spaced apart from one another in a lateral direction. Accordingly, the height of the mixture in a direction running transversely to the conveying direction of the sieve or conveyor floor is detected.

A plurality of sensors arranged one above the other and the at least one associated emitter can in each case form a photoelectric barrier and a plurality of photoelectric barriers can be arranged offset relative to one another in a lateral direction and/or conveying direction of the mixture in order to detect a detection of the distribution of the mixture at a plurality of positions distributed over the width of the conveyor floor or sieve. In order to detect the distribution in the longitudinal direction of the sieve or conveyor floor, alternatively or additionally a plurality of photoelectric barriers are arranged one behind the other in the longitudinal direction.

A plurality of sensors arranged one above the other and at least one emitter (or a plurality of emitters associated in particular in each case with a sensor) can be arranged inside a common housing and be associated with different photoelectric barriers. In one embodiment, the sensors face toward a first side and the emitter or emitters emits or emit in the direction of the other side in each case. Such an embodiment is shown in FIG. 4. In another embodiment, both the emitter or emitters and the sensors can emit or face in the direction of the same side, i.e. the photoelectric barrier can function in reflective mode, or the emitters and receivers of two adjacent housings can be activated alternately, as shown in FIG. 5.

The housing can be arranged in a recess of a separating plate. Such separating plates (or runners or fins) extending in the longitudinal and conveying direction of the conveyor floor or sieve and perpendicularly upward from its upper side serve to prevent the mixture being conveyed on the upper side of the conveyor floor or sieve from sliding toward the downward sloping side of the conveyor floor or sieve.

A cleaning system can be equipped with a conveyor floor and/or a sieve and a sensor assembly. The sieve can be a top sieve, a bottom sieve, and/or a pre-sieve. The conveyor floor can be situated at any desired location at which harvested crops need to be transported inside the cleaning system or are fed to the cleaning system. In particular, the conveyor floor serves to convey the mixture from a threshing and/or separating device of any type, optionally over a cascade, to a sieve of the cleaning system. Further conveying devices can be arranged upstream or downstream from the conveyor floor. The conveyor floor usually includes a sawtooth-like surface and is set in a shaking, vibrating, or oscillating movement in order to transport the mixture.

The analysis device can be connected to a control unit which is configured to activate, based on the output signal, an actuator of a combine harvester in terms of making the lateral distribution of the mixture uniform when necessary, i.e. when the said distribution is non-uniform and exceeds a specified threshold value.

In particular, the control unit can be configured to activate, by means of the actuator, flaps which are distributed on the underside of the threshing region of an axial threshing unit in its peripheral direction in such a way that the flaps are closed at that side at which the height of the mixture is greater than on the other side and are opened on the side with a smaller height of the mixture and/or to activate a drive of a cross conveyor arranged between the conveyor floor and the sieve and/or a drive for adjusting guide plates in order to control the lateral distribution of the mixture.

While the above describes example implementations of the present disclosure, these descriptions should not be viewed in a limiting sense. Rather, other variations and modifications may be made without departing from the scope and spirit of the present disclosure as defined in the appended claims.

The invention claimed is:

1. A sensor assembly configured to detect a height of a mixture on a conveyor floor or a sieve of a cleaning system of a combine harvester, the sensor assembly comprising:
- at least two light-sensitive sensors, positioned one above the other, wherein the at least two light-sensitive sensors are attached to an upper side of the conveyor floor or the sieve;
- an emitter positioned at a distance from the sensors, wherein the emitter is attached to the upper side of the conveyor floor and/or the sieve, wherein the sensors are configured to receive light radiated from the emitter while a path of the light from the emitter to the sensors is not interrupted by the mixture; and
- an analysis device operably coupled to the sensors, the analysis device configured to generate an output signal representative of the height of the mixture on the basis of an output signal received from the sensors, wherein the output signal indicates a measured height of the mixture based on which of the at least two light-sensitive sensors receives light from the emitter and which of the at least two light-sensitive sensors does not receive light from the emitter due to interruption by the mixture.

2. The sensor assembly of claim 1, wherein the emitter is configured to emit light in any of the visible range, the infrared range, and/or the ultraviolet wavelength range, and the sensors are sensitive within the corresponding wavelength range.

3. The sensor assembly of claim 1, wherein the sensors and the emitter are spaced apart from one another in a lateral direction.

4. The sensor assembly of claim 1, wherein the sensors and the emitter are assembled to form a photoelectric barrier, and further wherein a plurality of the photoelectric barriers are arranged offset relative to one another in a lateral direction and/or a conveying direction of the mixture.

5. The sensor assembly of claim 4, wherein each of the plurality of the photoelectric barriers includes the sensors and the emitter arranged inside a housing.

6. The sensor assembly of claim 5, wherein each of the housings is arranged in a recess of a separating plate.

7. A cleaning system with a conveyor floor or a sieve of a combine harvester, the cleaning system comprising:
- a sensor assembly configured to detect a height of a mixture on the conveyor floor and/or the sieve, the sensor assembly including:
  - at least two light-sensitive sensors, positioned one above the other, wherein the at least two light-sensitive sensors are attached to an upper side of the conveyor floor or the sieve;
  - an emitter positioned at a distance from the sensors, wherein the emitter is attached to the upper side of the conveyor floor and/or the sieve, wherein the sensors are configured to receive light radiated from the emitter while a path of the light from the emitter to the sensors is not interrupted by the mixture; and
- an analysis device operably coupled to the sensors, the analysis device configured to generate an output signal representative of the height of the mixture on the basis of an output signal received from the sensors, wherein the output signal indicates a measured height of the mixture based on which of the at least two light-sensitive sensors receives light from the emitter and which of the at least two light-sensitive sensors does not receive light from the emitter due to interruption by the mixture.

8. The cleaning system of claim 7, wherein the analysis device is connected to a control unit that is configured to activate, based on the generated output signal, an actuator assembled with the combine harvester to control a lateral distribution of the mixture in a uniform distribution.

9. The cleaning system of claim 8, wherein the actuator is configured to activate one or more flaps that are distributed on an underside of a threshing region of an axial threshing unit assembled with the combine harvester.

10. The cleaning system of claim 9, wherein the one or more flaps are activated in a peripheral direction in such a way that the one or more flaps are closed at that side on which the height of the mixture is greater than on the other side, and the one or more flaps are opened on the side with a smaller height of the mixture to thereby adjust one or more guide plates to control the lateral distribution of the mixture.

11. The cleaning system of claim 10, wherein the adjustment of the one or more guide plates is performed by a drive of a cross conveyor arranged between the conveyor floor and the sieve.

12. A combine harvester comprising:
- a cleaning system with a conveyor floor or a sieve;
- a sensor assembly configured to detect a height of a mixture on the conveyor floor or the sieve, the sensor assembly including:
  - at least two light-sensitive sensors, positioned one above the other, wherein the at least two light-sensitive sensors are attached to an upper side of the conveyor floor or the sieve;
  - an emitter positioned at a distance from the sensors, wherein the emitter is attached to an upper side of the conveyor floor and/or the sieve, wherein the sensors are configured to receive light radiated from the emitter while a path of the light from the emitter to the sensors is not interrupted by the mixture; and
- an analysis device operably coupled to the sensors, the analysis device configured to generate an output signal representative of the height of the mixture on the basis of an output signal received from the sensors, wherein the output signal indicates a measured height of the mixture based on which of the at least two light-sensitive sensors receives light from the emitter and which of the at least two light-sensitive sensors does not receive light from the emitter due to interruption by the mixture.

13. The combine harvester of claim 12, wherein the emitter is configured to emit light in any of the visible range, the infrared range, and/or the ultraviolet wavelength range, and the sensors are sensitive within the corresponding wavelength range.

14. The combine harvester of claim 12, wherein the sensors and the emitter are spaced apart from one another in a lateral direction.

15. The combine harvester of claim 12, wherein the sensors and the emitter are assembled to form a photoelectric barrier, and further wherein a plurality of the photoelectric barriers are arranged offset relative to one another in a lateral direction and/or a conveying direction of the mixture.

16. The combine harvester of claim 15, wherein each of the plurality of the photoelectric barriers includes the sensors and the emitter arranged inside a housing assembled with the conveyor floor.

17. The combine harvester of claim 12, wherein the analysis device is connected to a control unit that is configured to activate, based on the generated output signal, an actuator assembled with the combine harvester to control a lateral distribution of the mixture in a uniform distribution.

18. The combine harvester of claim 17, wherein the actuator is configured to activate one or more flaps that are distributed on an underside of a threshing region of an axial threshing unit assembled with the combine harvester.

19. The combine harvester of claim 18, wherein the one or more flaps are activated in a peripheral direction in such a way that the one or more flaps are closed at that side on which the height of the mixture is greater than on the other side, and the one or more flaps are opened on the side with a smaller height of the mixture to thereby adjust one or more guide plates to control the lateral distribution of the mixture.

20. The cleaning system of claim 19, wherein the adjustment of the one or more guide plates is performed by a drive of a cross conveyor arranged between the conveyor floor and the sieve.

* * * * *